July 24, 1956     W. P. CHAPMAN     2,755,664
FLUID FLOW METER
Filed Dec. 27, 1952
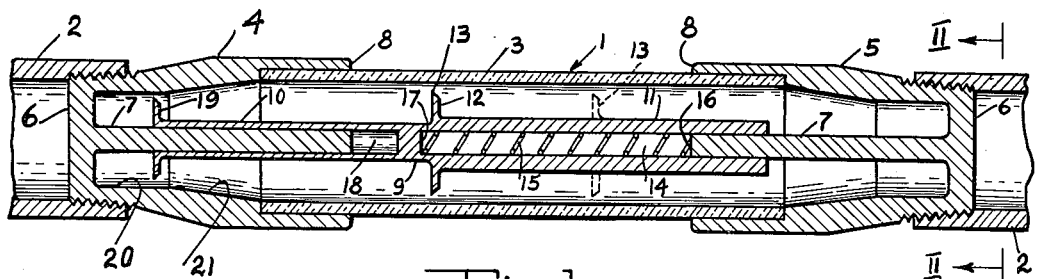
Fig. 1.
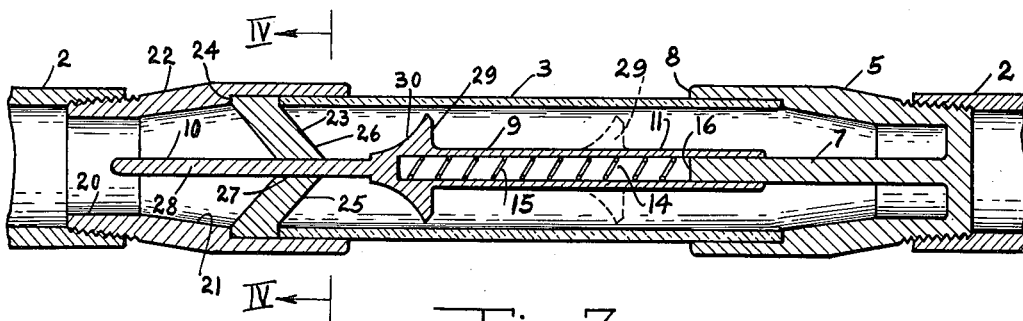
Fig. 3.
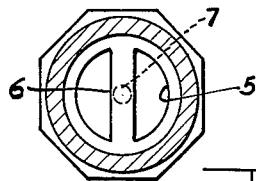     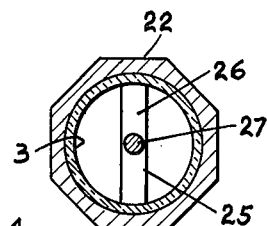
Fig. 2.     Fig. 4.
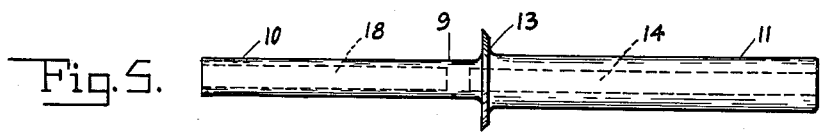
Fig. 5.
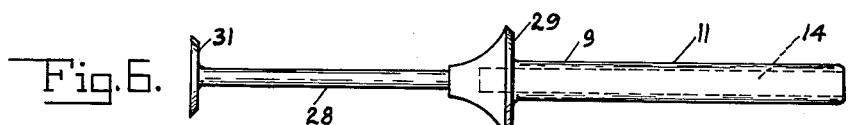
Fig. 6.
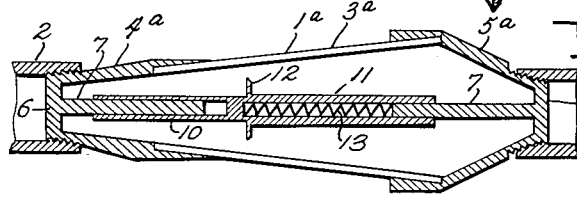
Fig. 7.
INVENTOR.
WILLIAM P. CHAPMAN.
BY
Christy Parmelee & Strickland
ATTORNEYS.

United States Patent Office 2,755,664
Patented July 24, 1956

2,755,664

FLUID FLOW METER

William P. Chapman, Pittsburgh, Pa.

Application December 27, 1952, Serial No. 328,218

9 Claims. (Cl. 73—209)

This invention relates, as indicated, to a fluid flow meter, and, more particularly, to a meter of inexpensive construction which may be permanently connected in a conduit and which will not only give an indication of fluid flow but also of the quantity or rate of fluid flowing through the conduit.

Many proposals of connecting instruments into fluid flow conduits have been made heretofore but the instruments proposed have been generally for the purpose of giving an indication of whether or not fluid is flowing and in most instances have not been capable of giving accurate information concerning the quantity or rate of fluid flow. Moreover, such instruments have usually been of a complicated and expensive construction such that their use in large numbers has not been practical. In addition, such indicators have been of such delicate nature as to give faulty operation and to result in cloggage particularly where the fluid flowing through the conduit is unclean or carries considerable solid matter which is apt to accumulate on projections in its path of movement.

One of the principal objects of this invention is to provide a metering device for conection in fluid conduits which may be manufactured at low cost and which will not only give an indication of the presence of fluid flow but which will also advise of the rate or quantity of fluid flow. To the end of providing a meter which is inexpensive and not complicated in construction, this invention contemplates a meter which is composed essentially of only five parts. These five parts are, respectively: a transparent tube; two fittings, one at each end of the tube and in fluid sealing engagement therewith; a rod-like indicator mounted for movement axially of the tube; and a biasing spring. The fittings on the ends of the tube are constructed to provide a sliding support for the ends of the indicator and arranged so that it has a rectilinear movement axially the tube which is proportional to and, in the preferred embodiment of the invention, linear with respect to the rate of fluid flow. In a manner to be described, there is only one movable operating part, the indicator rod, which in the preferred embodiment of the invention has contact with the fluid flowing through the conduit, the other parts exposed to the action of the fluid being stationary and essentially self-cleaning in construction. By reason of its simplicity, the instrument has a low manufacturing cost and has rugged characteristics such that it is not likely to provide faulty operation in use. The indicator rod has a relatively long path of movement and moves to a position relative to the tube which is proportional to the rate of flow so that its position as viewed through the tube will provide an indication of the quantity or rate of fluid being conducted.

The metering instrument of this invention is particularly adapted for use in calibrating the flow of fluid through branch conduits from a main supply conduit. In such case, the operator may readily adjust the rate of flow to the proper amount by adjusting a control valve while observing the meter in the branch conduit. As an example of its use, reference may be made to heating installations wherein the flow of fluid through branch circuits must be proportioned in accordance with the heating requirements of the rooms or buildings supplied by such branch circuits. In most heating installations, the proper adjustments heretofore had to wait until the system was operated under cold weather conditions. However, when a meter constructed in accordance with the principles of this invention is installed in each of the branch circuits, the flow through the branch circuits may be adjusted in accordance with calculated heating requirements of the rooms or buildings on such branch circuits and without the necessity of awaiting cold weather conditions.

Other objects and advantages of the invention will become apparent from the following description.

In the drawings there are shown two embodiments of the invention. In this showing:

Fig. 1 is a longitudinal sectional view of one embodiment;

Fig. 2 is a sectional view taken substantially along the line II—II of Fig. 1;

Fig. 3 is a longitudinal sectional view of a modified embodiment of the invention;

Fig. 4 is a sectional view taken substantially along the line IV—IV of Fig. 3;

Fig. 5 is an elevational view of a modified form of indicator rod for use in the embodiment of the invention shown in Fig. 1; and Fig. 6 is an elevational view of a modified form of indicator rod for use in the embodiment of the invention shown in Fig. 3.

Fig. 7 is a longitudinal sectional view of a modified form of the invention as disclosed in Fig. 1.

In the embodiment shown in Fig. 1, the indicator is designated as a whole by the numeral 1 and is adapted to have its ends connected in a conduit 2 so that it forms a continuation of the fluid flow passage through the conduit. The indicator comprises a transparent tube 3 of uniform diameter, which may be glass or other transparent material such as a suitable plastic, and preferably has an inner diameter substantially the same as the diameter of the conduits 2 in order that it will not materially interfere with the flow of fluid through the conduit. The ends of the tube 3 have fluid sealing engagement with fittings 4 and 5 which in the preferred embodiment are identical in construction. The outer ends of the fittings 4 and 5 are threaded for engagement in the ends of the conduit 2.

Each of the fittings 4 and 5 is provided with a transversely extending support or strap 6, as best shown in Fig. 2, which carries an inwardly projecting stud or prong 7. The prongs 7 extend toward each other in a direction axially and concentrically of the tube 3 and each preferably terminates at a point adjacent the inner end 8 of the fitting.

The prongs 7 provide a sliding support for an elongated rod-like indicator element 9. The indicator 9 is comprised of a down stream end 10 and an up stream end 11, there being a disc 12 mounted concentrically thereon and separating the two ends 10 and 11. The outer edge 13 of the disc is spaced from the inner surface of the tube 3 to provide space through which fluid may flow from left to right as viewed in Fig. 1. The end 11 is provided with a centrally and axially extending opening which extends over substantially its entire length. A spring 15 is mounted in the opening 14 with one end bearing against the outer end 16 of the prong 7 and its other end bearing against the inner end 17 of the opening 14. The spring 15 provides a bias against movement of the rod 9 to the right as viewed in Fig. 1 by the action of the fluid flowing through the tube 1 from left to right. The end 11 and the end 16 of prong 7 receivable in the opening 14 provides an enclosure housing for the spring 15 which completely isolates the spring 15 from the fluid flowing through the tube 1.

The other end 10 of the indicator rod 9 is provided with a similar opening 18 which extends centrally and axially of the tube 1 and in which the prong 7 on the fitting 4 is received. The sliding fit of the prongs 7 in the openings 14 and 18 provides a sliding support for the indicator 9.

By reason of its mounting, the indicator rod 9 has a guided rectilinear movement over a relatively long path axially of the tube 3. This path of movement of the rod is between a position with the parts as shown in full lines and a position with the disc 13 as shown in dotted lines, the latter position being limited only by the complete compression of the spring 15. The rod 9 has an overall length greater than the distance between adjacent surfaces of the mounting parts 7 and thus has its sliding support maintained at both ends in all of its positions of movement. Movement of the rod 9 to the right as viewed in Fig. 1 against the action of the biasing spring 15 is effected primarily by the fluid reacting against the disc 13. Since the inner diameter of the tube 3 is uniform about the disc 13 over its entire length of travel, the rod will be moved to a position varying with the velocity of the fluid moving through the tube 3. Since the tube 3 is transparent, the position of the disc 13 may be observed from any point about its periphery, and, from its relative position, an observation may be had of the quantity of fluid flowing through the tube. The tube 3 need have a length between the fitting ends only slightly greater than the path of movement of the rod. The tube further is provided with indicia (not shown) calibrated in cubic feet per second or gallons per minute, so that the position of the disc opposite such indicia will indicate rate or quantity of fluid flow.

Since the force exerted by the fluid against the disc 13 will vary with the square of its velocity of flow, and since the compression of the spring will vary directly with the force applied thereto, it will be apparent that movement of the rod will not be uniform for varying changes in velocity in the absence of any compensating factor and the indicia applied to the tube 3 must be calibrated accordingly. In order to obtain a linear response by which changes in velocity will result in equal changes in the position of the rod, the outer terminal of the rod end 10 is provided with a circular disc 19 mounted concentrically thereon. The fitting 4 has a bore 20 of minimum diameter in which the disc 19 is received when there is no fluid flowing. Outwardly of the bore 20, the fitting 4 is provided with a tapered bore 21 which diverges in an axial direction toward the tube 3 and in the direction of fluid flow. When fluid starts flowing through the conduit 2, the reaction of the fluid against the discs 19 and 12 moves the rod against the biasing action of the spring 15, and, as this movement takes place, the disc 19 moves to the right in the tapered bore 21. The velocity head of the fluid passing over the disc 19 decreases in accordance with the position of the disc 19 in the tapered bore 21, and the force of the fluid against the disc 19 is diminished accordingly. The force exerted by the fluid against the disc 19 thus will decrease with increasing velocity by reason of its change in position in the bore 21 while the force exerted by the fluid against the disc 13 is increasing. By properly proportioning the taper of the bore 21 to the movement of the rod in response to increasing velocity, it is possible to obtain a rod movement which is directly proportional and linear to velocity changes. While a second disc 19 in a tapered bore 21 is provided for obtaining a proportional and linear movement of the rod 9, it will be understood that this result may be accomplished by providing the tube 3 with a tapered bore having an internal diameter which increases in the direction of fluid flow. However, from the standpoint of cost, the tube 3 having a uniform internal diameter is preferred.

The indicator end 11 has an external diameter greater than the external diameter of the indicator end 10. Due to this difference in diameters of the ends 10 and 11, there is a difference in the velocity head of the fluid flowing over the end 10 as compared to the velocity head of the fluid flowing over the end 11. This difference in velocity heads of the fluid moving over the ends 10 and 11 results in a differential pressure head which reacts against the disc 13 to move the indicator rod 9 against the action of its biasing spring 15. This differential pressure head is utilized to compensate for back pressure exerted by fluid which may leak into the opening 14 through small spaces about the prong 7 and interiorly of the hollow end 11.

In the modification shown in Fig. 3, like numerals have been employed to designate like parts. The difference in this embodiment lies essentially in the substitution of a modified form of fitting 22 for the fitting 4 of Fig. 1 and in a change in the structure of the end 10 of the indicator rod 9. The fitting 22 is provided with a threaded connection for attachment to the conduit 2 as in the case of the fitting 4. To support the end 10 of the indicator 9, there is provided a transversely extending member 23 which has its ends clamped between an end of the tube 3 and a shoulder 24 on the fitting 22. The transversely extending member 23 is formed of two integral parts 25 and 26 which converge angularly in the direction of fluid flow so as to minimize the collection of solids thereon. Centrally of the parts 25 and 26, there is provided an axially extending opening 27 in which the end 10 of the indicator is received. The end 10 in this modification is designed by the numeral 28 and is a solid section having a sliding fit in the opening 27. The ends 11 and 28 are separated by a disc 29 of modified construction having a sloping surface 30 essentially conical in shape which converges in a direction opposed to the direction of fluid flow in the interest of providing a self-cleaning action. The action of the disc 29 is otherwise similar to the action of the disc 13 of Fig. 1, and it will be noted that the diameter of the indicator end 28 is smaller than the diameter of the indicator end 11 so that a pressure differential is had against the disc 29 as described in connection with the modification of Fig. 1.

In Fig. 5 there is shown a modified form of indicator rod 9 for use in the modification shown in Fig. 1. The only difference in this form of indicator rod lies in the fact that the disc 19 has been omitted from the terminal of the end 10.

In Fig. 6 a modified form of indicator rod 9 is shown for use in the indicator shown in Fig. 3. In this showing, the indicator end 28 is provided with a disc 31 on its terminal end to provide the same action in the bores 20 and 21 within the fitting 22 as does the disc 19 in the fitting 4.

In Fig. 7 a modified form of the transparent tube 3 is shown for use with the metering device shown in Fig. 1. In this modified showing the disc 19 is omitted from the member 10 and the transparent tube 3a is provided with a tapering diameter increasing in the direction of flow of the fluid through the tube. To accommodate this tapering member 3a the fittings 4a and 5a have their end portions receiving the member 3a correspondingly tapered for this purpose.

From the foregoing, it will be apparent that the metering device of this invention is one which may be connected in a conduit to provide not only an indication of the fact that fluid is flowing but also an indication of the quantity or rate of fluid flow. Attention is particularly directed to the fact that the disc 13 functions as an indicator and that the transparent portion of the tube 3 has a length greater than the path of movement of the disc 13 so that the disc is observable in all of its relative positions.

The instrument does not require any expensive parts and may be assembled readily. To assemble, the rod 9 with spring 15 in the opening 14 is placed on the prong 7 of the fitting 5 after which the tube is applied to the fitting 5. The assembly may then be completed by application of the fitting 4 to the other end of the tube 3. As indicated above, the fittings 4 and 5 have a liquid seal with the ends of the tube. This seal may be provided by a threaded engagement (not shown) of the tube ends in the fittings 4 and 5, a glass to metal seal, or any other suitable liquid sealing connection.

Attention is also directed to the fact that the only moving part of the instrument is the rod 9, the spring being completely enclosed, the other parts, such as the fittings, the supporting straps 6, and the prongs 7, being stationary. These stationary parts are essentially self-cleaning in that any dirt tending to accumulate thereon will be washed off by the force of the flowing liquid thus minimizing the possibility of cloggage. It will also be noted that the sliding action of the ends 10 and 11 on their mounting parts provides a cleaning action as a result of the indicator rod movement.

Since the only moving part is the indicator rod which has a relatively small mass, it will be apparent that gravity has little effect on the action of the instrument. As a result the instrument may be mounted in any vertical or horizontal position, or in any position intermediate the horizontal and vertical.

While I have illustrated the described several specific embodiments of my invention, it will be understood that this is merely by way of illustration, and that various changes and modifications may be made therein within the contemplation of the invention and under the scope of the following claims.

I claim:

1. A metering device for indicating rate of fluid flow comprising a conduit section having separate fittings at its ends providing fluid inlet and outlet passageway openings, a body member connected to and spacing said fittings from each other and having a passageway of uniform interior diameter through which fluid may flow from said inlet opening to said outlet opening, an elongated indicator rod extending centrally and axially of said passageway, supporting means in said fittings for mounting said rod for sliding movement axially of said passageway, a spring biasing the movement of said rod toward said inlet opening, and means responsive to the flow of fluid through said passageway for moving said rod toward said outlet opening against the action of said biasing spring to positions varying with the velocity of fluid flowing comprising a disc mounted on said rod, said disc having its peripheral edge uniformly spaced from the inner surface of said passageway in all positions of the rod therein to provide an unobstructed opening about said disc for the movement of fluid through said passageway in any of the positions of said rod therein, said body member including a transparent axially extending section of a length at least equal to the axial movement of said rod through which the relative position of the rod with respect to said transparent section may be observed to obtain an indication of the rate and quantity of fluid flowing through said passageway.

2. A metering device as claimed in claim 4 characterized by the portion of said passageway through which the disc moves having a tapering bore which increases in diameter in the direction of fluid flow.

3. A metering device as claimed in claim 1 characterized by the provision of a second disc on said rod at a point spaced axially from said first disc, the portion of said inlet passageway through which the second disc moves having a tapering bore which increases in diameter in the direction of fluid flow.

4. A device for metering the flow of fluid through a conduit comprising a unit having a pair of spaced fittings for connection in the conduit, an elongated and axially movable rodlike member extending between said fittings, each of said fittings having a mounting part providing a sliding support for the ends of said member, one of said parts comprising a prong projecting toward said member, the end of said member supported by said one part having an axially extending opening in which said prong is received, a spring mounted in said opening with one end bearing against said prong and its other end bearing against said member at the inner end of said opening for biasing the sliding movement of the member in a direction away from said prong, a transparent tube enclosing said member and spacing said end fittings from each other, each of said fittings having a fluid sealing connection with an end of said tube, and an indicator disc mounted concentrically on said member intermediate its ends for moving the member against the biasing action of said spring in response to the flow of fluid through the tube, the relative position of the disc with respect to said tube being observable through the tube to provide a visible indication of the flow of fluid therethrough.

5. A device as claimed in claim 4 characterized by the end of said member in which said opening is provided having a diameter greater than the other end of said member whereby the change in velocity head of the fluid flowing through the tube due to the differences in diameter of the member ends creates a pressure differential reacting against said spring.

6. A device as claimed in claim 4 characterized by the other of said mounting parts comprising a second prong projecting toward said member and the end of said member supported by said other part being provided with an axially extending opening in which said second prong is received.

7. A device as claimed in claim 4 characterized by the other of said mounting parts comprising a member extending transversely of its fitting and having a centrally located opening in which the member end supported thereby has a sliding fit.

8. A device for metering the flow of fluid through a conduit comprising a unit having a pair of spaced fittings for connection in a conduit and respectively provided with a centrally located mounting part, a rod-like member extending between said fittings and having a length greater than the distance between said mounting parts, said mounting parts respectively providing a sliding support for opposite ends of said member, one of said mounting parts comprising a prong projecting toward said member, the end of said member supported by said one part having an axially extending opening in which said prong is received, a spring mounted in said opening with one end bearing against said prong and its other end bearing against said member at the inner end of said opening for biasing the sliding movement of the member on said mounting parts in a direction away from said prong, the end of said prong and the member end in which said axially extending opening is formed cooperating to provide an enclosure housing for said spring, a transparent tube enclosing said member and spacing said fittings from each other, each of said fittings having a fluid sealing connection with an end of said tube, and a disc concentrically mounted on said member intermediate its ends for moving the member against the biasing action of said spring in response to the flow of fluid through the tube, the relative position of the disc with respect to said tube being observable through the tube to provide a visible indication of the flow of fluid therethrough.

9. A device as claimed in claim 8 characterized by the provision of a second disc on the terminal of the member end supported by the other of said mounting parts, the fitting about said second disc having a tapering bore which diverges in the direction of member movement in response to fluid flow whereby the velocity head acting against said second disc decreases with movement of the member.

References Cited in the file of this patent
UNITED STATES PATENTS

| | | |
|---|---|---|
| 1,205,787 | Rosencrants | Nov. 21, 1916 |
| 1,215,129 | Edlich | Feb. 6, 1917 |
| 1,385,973 | Brown | July 26, 1921 |
| 1,910,752 | Coles | May 23, 1933 |

FOREIGN PATENTS

| | | |
|---|---|---|
| 309,559 | Great Britain | Mar. 27, 1930 |